United States Patent
Saeki et al.

(10) Patent No.: US 10,499,670 B2
(45) Date of Patent: Dec. 10, 2019

(54) METHOD FOR PRODUCING PROCESSED COOKED RICE, AND PROCESSED COOKED RICE

(71) Applicant: NISSIN FOODS HOLDINGS CO., LTD., Osaka-shi, Osaka (JP)

(72) Inventors: Kentaro Saeki, Osaka (JP); Yuichiro Takagi, Osaka (JP); Masashi Komatsu, Osaka (JP); Mitsuru Tanaka, Osaka (JP)

(73) Assignee: NISSIN FOODS HOLDINGS CO., LTD., Osaka (JP)

(*) Notice: Subject to any disclaimer, the term of this patent is extended or adjusted under 35 U.S.C. 154(b) by 0 days.

(21) Appl. No.: 15/031,629

(22) PCT Filed: Oct. 23, 2014

(86) PCT No.: PCT/JP2014/078174
§ 371 (c)(1),
(2) Date: Apr. 22, 2016

(87) PCT Pub. No.: WO2015/060374
PCT Pub. Date: Apr. 30, 2015

(65) Prior Publication Data
US 2016/0262432 A1    Sep. 15, 2016

(30) Foreign Application Priority Data

Oct. 24, 2013 (JP) ................................. 2013-220709

(51) Int. Cl.
*A23C 9/12*    (2006.01)
*A23L 7/104*    (2016.01)

(52) U.S. Cl.
CPC ........... *A23L 7/107* (2016.08); *A23V 2002/00* (2013.01)

(58) Field of Classification Search
CPC ......... A23L 1/1055; A23L 1/18; A23L 1/1826
USPC .......................................................... 426/61
See application file for complete search history.

(56) References Cited

U.S. PATENT DOCUMENTS

| | | | | |
|---|---|---|---|---|
| 2,686,130 A | * | 8/1954 | Roberts | A23L 7/196 426/402 |
| 3,647,486 A | * | 3/1972 | Tollefson | A23B 5/02 426/407 |
| 5,045,328 A | * | 9/1991 | Lewis | C12Y 302/0100 426/28 |
| 2012/0121760 A1 | | 5/2012 | Matsunaga et al. | |

FOREIGN PATENT DOCUMENTS

| | | |
|---|---|---|
| JP | 48-037827 | 11/1973 |
| JP | 51-032751 | 3/1976 |
| JP | 51-121542 | 10/1976 |
| JP | 6-141794 | 5/1994 |
| JP | 7-031389 | 2/1995 |
| JP | 7-289186 | 11/1995 |
| JP | 8-000197 | 1/1996 |
| JP | 8-140600 | 6/1996 |
| JP | 9-294554 | 11/1997 |
| JP | 10-094368 | 4/1998 |
| JP | 11-285352 | 10/1999 |
| JP | 2010-207128 | 9/2010 |
| WO | 2011/007404 | 1/2011 |

OTHER PUBLICATIONS

JP-401132346—Origial Document and English Abstract.*
JP-01-132346—Machine-Translation.*
Office Action in corresponding Taiwanese Patent Application No. 103136774, dated Jan. 22, 2016, 7 pages with translation.
International Search Report issued in PCT1JP20141078174, dated Jan. 27, 2015.
Office Action issued in corresponding Chinese Patent Application No. 201480057830.6, dated Mar. 28, 2019, 9 pages with translation.

* cited by examiner

*Primary Examiner* — Hamid R Badr
(74) *Attorney, Agent, or Firm* — Hamre, Schumann, Mueller & Larson, P.C.

(57) ABSTRACT

[Problem] To provide a method for producing processed cooked rice that renders cooked rice excellent in terms of both easiness to be loosened and texture, and is useful for stabilization of both steps and quality.
[Solution] A method for producing processed cooked rice comprising the step of cooking rice using two or more amylases having different optimum acting temperatures to thereby improve the easiness of cooked rice to be loosened and the texture. Preferably, the method for producing processed cooked rice comprises the step of cooking rice using one or more heat-resistant amylases having an optimum acting temperature of 60 to 100° C. and one or more amylases having an optimum acting temperature of 30 to 60° C.

5 Claims, No Drawings

METHOD FOR PRODUCING PROCESSED COOKED RICE, AND PROCESSED COOKED RICE

TECHNICAL FIELD

The present invention relates to a method for producing processed cooked rice easy to be loosened. More particularly, the present invention relates to a method for producing processed cooked rice comprising adding two or more amylases having different optimum acting temperatures in the step of cooking rice to thereby improve easiness of cooked rice to be loosened and to produce processed cooked rice having an excellent texture. Further, the present invention relates to processed cooked rice produced by the production method of the present invention.

BACKGROUND ART

For example, in Japan, with diversification and westernization of eating habits in recent years, consumption of rice tends to decrease every year. Therefore, development of rice-based processed foods is strongly required in order to increase consumption of rice, and there have been provided dried cooked rice for instant food products (rice porridge, rice porridge with other ingredients, risotto, and the like) (Patent Literature 1), and frozen foods (Patent Literature 2).

It is strongly required to enhance the reconstitutability of dried cooked rice particularly used for instant food products, and for example, methods for processing gelatinized rice or puffed dried rice used for instant food products and utilizing it have been studied and developed in order to shorten reconstitution time for dried cooked rice or to improve the reconstitutability (Patent Literature 3 to 5). Here, gelatinized rice refers to rice obtained by cooking polished white rice while preventing its tissue from being broken, and then quickly drying the cooked rice so that it has a moisture content of 17% or less while keeping gelatinized state of starch. Thereby, starch can be preserved for a long time while keeping its gelatinized state, and such gelatinized rice can be reconstituted usually within several tens of minutes into a similar state as cooked rice only by adding water or boiling water. Puffed dried rice refers to dried rice obtained by gelatinizing (cooking) rice, adjusting its moisture content, and then drying the resulting rice at high drying temperature to puff its tissue. Such puffed dried rice is reconstituted for eat by adding boiling water and allowing to stand for a few minutes, or reconstituted for eat by adding water and cooking in a microwave.

Dried cooked rice generally used is produced by drying with hot air or vacuum-freeze-drying cooked rice obtained by a usual method for cooking rice. In the production process, it is required to mechanize the steps of, for example, loosening, weighing, filling, and forming cooked rice, and in these steps, improvements of cooked rice such as reduction in sticking of grains of rice of each other and adhering of grains of rice to a machine are required.

Stickiness and hardness of cooked rice are very important factors for its eating quality. White cooked rice and most processed cooked rice tend to be easy to be loosened but become cooked rice having a hard texture without stickiness when the moisture content after cooking rice is low. On the other hand, when moisture content after cooking rice is high, cooked rice having moderate stickiness and hardness can be obtained but the cooked rice tends to be difficult to be loosened to cause uneven drying and unevenness of texture. Therefore, it is desired to develop a method for producing processed cooked rice that can cope with both easiness of cooked rice to be loosened and improvement in texture in cases where the moisture content after cooking rice is high.

There has been a case where an enzyme composition for cooking rice comprising a heat-resistant α-amylase was developed for the purpose of improving easiness of cooked rice to be loosened (Patent Literature 6). However, its effect is not necessarily satisfactory, and a more effective method is required.

CITATION LIST

Patent Literature

Patent Literature 1: Japanese Patent Laid-Open No. 9-294554

Patent Literature 2: Japanese Patent Laid-Open No. 11-285352

Patent Literature 3: Japanese Patent Laid-Open No. 7-31389

Patent Literature 4: Japanese Patent Laid-Open No. 51-32751

Patent Literature 5: Japanese Patent Laid-Open No. 51-121542

Patent Literature 6: Japanese Patent Laid-Open No. 7-289186

SUMMARY OF INVENTION

Technical Problem

In order to enhance easiness of cooked rice to be loosened, other than using an enzyme composition for cooking rice comprising a heat-resistant α-amylase, a method adding any of various emulsifiers and oils and fats or using a special machine for loosening cooked rice has been adopted when cooking rice. However, these methods have the big problems of change in taste, damage to rice, and the like, and thus they are not production methods that can cope with both easiness to be loosened and improvement in texture of cooked rice.

The present invention provides a production method that brings about easiness of cooked rice to be loosened, an excellent texture, and less unevenness of texture in producing processed cooked rice. The present invention also provides processed cooked rice produced by the production method of the present invention.

Solution to Problem

The present inventors have been diligently studied methods for cooking rice in the production of processed cooked rice, and diligently investigated methods for cooking rice that produces cooked rice easy to be loosened with an excellent texture. As a result, the present inventors have been surprisingly found that a method for producing processed cooked rice that comprises the step of cooking rice using two or more amylases having different optimum acting temperatures can solve these problems to produce extremely excellent processed cooked rice, and thus the present inventors have been completed the present invention. It should be noted that an optimum acting temperature herein refers to a peak temperature at which the effect of an enzyme action is the highest.

In the production method, among the amylases, one or more amylases may be heat-resistant amylases.

More particularly, in the production method, one or more amylases having an optimum acting temperature of 60 to 100° C. and one or more amylases having an optimum acting temperature of 30 to 60° C. may be used.

In the production method, among the amylases, one or more amylases may be α-amylases.

Further, in the production method, the processed cooked rice may be gelatinized rice, puffed dried rice, vacuum-freeze-dried rice, chilled cooked rice, or frozen cooked rice.

Processed cooked rice according to the present invention is produced by the method for producing processed cooked rice mentioned above, and is processed cooked rice having easiness of cooked rice to be loosened and an excellent texture.

Advantageous Effects of Invention

According to the production method of the present invention, cooked rice is easy to be loosened in the production of the processed cooked rice, and as a result, in the production method of the present invention, processed cooked rice having excellent quality with less unevenness of texture on eating can be produced.

Further, according to the production method of the present invention, cooked rice is easy to be loosened. Therefore, the yield in the processing of cooked rice is improved, and also uneven drying can be decreased in a case of the processing involving a drying step. Thus, the production method of the present invention is a useful technique that can contribute to stabilization of the steps and quality.

In addition, processed cooked rice of the present invention is processed cooked rice that was produced as mentioned above, and has easiness of cooked rice to be loosened and a good texture.

DESCRIPTION OF EMBODIMENTS

The embodiment of the present invention will be described below. However, the present invention is not limited by the description below.

As rice as a raw material used in the present invention, various types of rice such as Japonica line, Indica line, long grain rice, short grain rice, or the like can be used without any particular limitations. Further, old rice can be effectively utilized.

As the amylases used in the present invention, two or more amylases having different optimum acting temperatures can be selected and used. As the amylase used in the present invention, α-amylase, β-amylase, glucoamylase, isoamylase, or the like can be used, and as each of enzymes, a heat-resistant enzyme or a non-heat-resistant enzyme can be arbitrary selected. Preferably, one or more of heat-resistant amylases and one or more of non-heat-resistant amylases are selected. For example, one or more heat-resistant amylases having an optimum acting temperature of 60 to 100° C. and one or more non-heat-resistant amylases having an optimum acting temperature of 30 to 60° C. may be selected. Further, when a heat-resistant α-amylase and a non-heat-resistant α-amylase are used as the heat-resistant amylase and the non-heat-resistant amylase, respectively, an extremely excellent effect can be exhibited on improvement in easiness of cooked rice to be loosened and texture. In other words, when amylases each having different optimum acting temperatures are used in combination, excellent processed cooked rice having less unevenness of texture on eating can be produced.

Hereinafter, unless otherwise noticed, a non-heat-resistant α-amylase is simply referred to as α-amylase.

As the heat resistant α-amylase, for example, a heat resistant α-amylase derived from genus *Bacillus* can be used. As the α-amylase, for example, an α-amylase derived from genus *Aspergillus* or derived from genus *Bacillus* can be used. More specifically, examples of the heat resistant α-amylase include Kleistase (registered trademark) E5CC having an optimum acting temperature of 70° C. (manufactured by Amano Enzyme Inc.), and examples of the α-amylase include Biozyme (registered trademark) A having an optimum acting temperature of 55° C. (manufactured by Amano Enzyme Inc.).

The amount of amylases used in the present invention is appropriately determined so as to obtain the intended effect, and the amount of each amylase is usually 0.01 to 20 U, preferably 0.1 to 10 U, per gram of rice.

In the step of cooking rice, amylases in the present invention can be added before cooking rice or during cooking rice, and for example, amylases can be added to water to be added in the step of cooking rice.

In the present invention, an oil, an emulsifier, a polyphosphate, or an antioxidant as an auxiliary material can be used as long as it does not have a bad influence on eating quality. Seasonings such as salt, soy sauce, and sugar can also be used for seasoning.

In the present invention, the method for cooking rice is not particularly limited, and rice may be cooked by a usual method such as cooking rice by gas, cooking rice electrical, cooking rice by IH, or cooking rice by steaming. For example, the following manner can be adopted: rice is cooked for 5 to 20 minutes until the temperature of rice being cooked reaches 65° C., and then heated until the temperature of rice being cooked reaches 95° C.; and the resulting rice is cooked and steamed for 10 to 60 minutes at the temperature of rice being cooked ranging from 90 to 110° C. As for the amount of water added for cooking rice, the amount of water added is appropriately adjusted to cook rice so as to obtain cooked rice having a texture with desired stickiness and hardness after cooking rice. For example, the amount of water added can be appropriately adjusted to cook rice so as to obtain a yield of cooked rice of 1.6 to 2.6 (corresponding to a moisture content just after cooking of 49 to 68%). A yield of cooked rice herein refers to a weight ratio of the weight of rice after cooking rice to the weight of rice before cooking rice.

It is generally preferred that the yield of cooked rice be controlled to become about 1.8 to 2.4 (corresponding to a moisture content just after cooking of 53 to 63%) in order to obtain cooked rice having appropriate stickiness and hardness, but the easiness of cooked rice to be loosened tends to be impaired when the yield of cooked rice is high. In contrast, rice cooked according to the present invention is easier to be loosened than rice cooked without any amylases at the same yield of cooked rice.

When cooked rice is easy to be loosened during processing in the production of processed cooked rice, a decrease in uneven drying, a stabilization of freezing, an improvement in the yield can be achieved in a case where a drying step or a freezing step is involved after cooking rice, and thus processed cooked rice having excellent quality can be produced. In this case, as the drying method or the freezing method, any known method can be applied.

Examples of the processed cooked rice produced by the producing method of the present invention include normal white cooked rice, brown cooked rice, steamed glutinous rice with adzuki beans, rice porridge, rice porridge with other ingredients, curry and rice, hash and rice, rice cooked with ingredients and seasonings, gelatinized rice and puffed dried rice thereof, dried cooked rice such as vacuum-freeze-dried rice, chilled cooked rice, and frozen cooked rice.

The processed cooked rice thus obtained can be provided for consumers after further optionally adding any of ingredients and seasonings thereto, placing in a container such as a cup-shaped container or a packaging bag, and sealing the container.

EXAMPLES

The present invention will be further described by way of comparative experiments as examples below.

As for amylases used in Examples and Comparative Examples, the type and the optimum acting temperature thereof are shown in Table 1. Hereinafter, Enzyme No. shown in Table 1 are used for description in Examples and Comparative Examples.

TABLE 1

| Enzyme No. | Trade Name | Type | Optimum acting temperature |
| --- | --- | --- | --- |
| Enzyme 1 | Kleistase E5CC | Heat-resistant α-amylase | 70° C. |
| Enzyme 2 | Biozyme A | α-amylase | 55° C. |
| Enzyme 3 | Biozyme LC | α-amylase | 45° C. |
| Enzyme 4 | Gluczyme AF6 | Glucoamylase | 58° C. |

* All manufactured by Amano Enzyme Inc.

Example 1

700 g of non-glutinous polished white rice was placed in a pot and washed, followed by draining. Then Enzyme 1 in an amount of 90 U per pot (corresponding to 0.13 U per gram of rice), Enzyme 2 in an amount of 90 U per pot (corresponding to 0.13 U per gram of rice), 0.7 g of salt, 5.775 g of an emulsified fat and oil, 2.1 g of a sucrose fatty acid ester, and 1.26 g of a polyphosphate were added thereto and mixed uniformly. The resultant was cooked for 15 minutes with water added in an amount of 160% based on the weight of the rice in a rice cooker (gas rice cooker RR-10KS manufactured by Rinnai Corporation), and steamed for 20 minutes to obtain cooked rice having a yield of cooked rice of 2.37 (corresponding to a moisture content just after cooking of 63%). This cooked rice was loosened while blowing air over it.

The loosened cooked rice was subjected to primary drying for 35 minutes in a drying chamber at an inside temperature of 70° C. and an air velocity of 1 m/s to dry it to a moisture content of 26% (weight ratio). The rice after the primary drying was allowed to stand for about 30 minutes, and then sieved to remove very sticky lumps of rice. Further, the resulting rice was passed between a pair of rolls twice to press and flatten the rice, first rolls having a 0.35 mm gap and second rolls having a 0.35 mm gap.

The pressed flattened rice was subjected to secondary drying for 15 minutes in a drying chamber at an inside temperature of 70° C. and an air velocity of 1 m/s to dry to a moisture content of 16%. The rice after the secondary drying was allowed to stand for about 30 minutes, and then dried to puff for 60 seconds at a temperature of 150° C. and an air velocity of 55 m/s in a high-temperature and high-velocity air drier, which can spray high-temperature airflow at a high velocity. The dried rice was thus puffed by drying for puffing to obtain puffed dried rice having a moisture content of 8%.

Example 2

Puffed dried rice was produced and obtained in the same manner as in Example 1 except that each amount of the enzymes added used in Example 1 was changed to 90 U per pot (corresponding to 0.13 U per gram of rice) for Enzyme 1 and 90 U per pot (corresponding to 0.13 U per gram of rice) for Enzyme 3.

Example 3

Puffed dried rice was produced and obtained in the same manner as in Example 1 except that each amount of the enzymes added used in Example 1 was changed to 90 U per pot (corresponding to 0.13 U per gram of rice) for Enzyme 1 and 90 U per pot (corresponding to 0.13 U per gram of rice) for Enzyme 4.

Comparative Example 1

Puffed dried rice was produced and obtained in the same manner as in Example 1 except that enzymes used in Example 1 were not used.

Comparative Example 2

Puffed dried rice was produced and obtained in the same manner as in Example 1 except that enzymes used in Example 1 were replaced with Enzyme 1 singly, and that the amount thereof added was 90 U per pot (corresponding to 0.13 U per gram of rice).

Comparative Example 3

Puffed dried rice was produced and obtained in the same manner as in Example 1 except that enzymes used in Example 1 were replaced with Enzyme 2 singly, and that the amount thereof added was 90 U per pot (corresponding to 0.13 U per gram of rice).

Comparative Example 4

Puffed dried rice was produced and obtained in the same manner as in Example 1 except that enzymes used in Example 1 were replaced with Enzyme 3 singly, and that the amount thereof added was 90 U per pot (corresponding to 0.13 U per gram of rice).

Comparative Example 5

Puffed dried rice was produced and obtained in the same manner as in Example 1 except that enzymes used in Example 1 were replaced with Enzyme 4 singly, and that the amount thereof added was 90 U per pot (corresponding to 0.13 U per gram of rice).

Comparative Example 6

Puffed dried rice was produced and obtained in the same manner as in Example 1 except that enzymes used in Example 1 were replaced with Enzyme 1 singly, and that the amount thereof added was 180 U per pot (corresponding to 0.26 U per gram of rice).

The cooked rice after the primary drying in Examples 1 to 3 and Comparative Examples 1 to 6 each was passed through a 3.5-mesh sieve to separate the rice passed through the sieve and the rice left on the sieve, and each of them was weighed. The sticking rate was calculated by the numerical expression below to evaluate easiness of cooked rice to be loosened when being dried. The evaluation was conducted according to five grades among which the evaluation result of Comparative Example 1 was defined as a grade of "2", which corresponds to the second from the lowest.

Sticking rate (%)=(the weight of the cooked rice left on the sieve)/(the weight of the whole of the cooked rice)×100

The puffed dried rice obtained in any one of Examples 1 to 3 and Comparative Examples 1 to 6 was placed in a cup-like plastic container, and 37.5 g of powdered curry soup, 2.5 g of dried seasoned beef, 1.5 g of dried potato, and 0.5 g of dried carrot were added thereto and mixed. A lid was put on the container, and the container was sealed to obtain a food product with a container. The food product with a container was stored for three days and then opened. 260 mL of water at 25° C. was added to the container, and the content thereof was lightly stirred. A lid was then put on the container, and cooking was conducted in a microwave (500 W) for 5 minutes and 30 seconds. Then the container was taken out of the microwave to obtain instant curry and rice. Five skilled panelists ate it and evaluated the texture of the cooked rice after reconstitution. The evaluation was conducted according to five grades among which the evaluation result of Comparative Example 1 was defined as a grade of "2", which corresponds to the second from the lowest.

The results of the sticking rate, easiness of cooked rice to be loosened, and the sensory evaluation of Examples 1 to 3 and Comparative Examples 1 to 6 are shown in Table 2.

TABLE 2

|  | Enzyme used (Amount of enzyme used) | Sticking ratio (%) | Easiness to be loosened | Texture |
|---|---|---|---|---|
| Example 1 | Enzyme 1 (90 U per pot) + Enzyme 2 (90 U per pot) | 9.2 | 5 | 5 |
| Example 2 | Enzyme 1 (90 U per pot) + Enzyme 3 (90 U per pot) | 9.3 | 5 | 5 |
| Example 3 | Enzyme 1 (90 U per pot) + Enzyme 4 (90 U per pot) | 13.8 | 3 | 4 |
| Comparative Example 1 | None | 34.3 | 2 | 2 |
| Comparative Example 2 | Enzyme 1 (90 U per pot) | 11.5 | 3 | 3 |
| Comparative Example 3 | Enzyme 2 (90 U per pot) | 40.5 | 1 | 3 |
| Comparative Example 4 | Enzyme 3 (90 U per pot) | 40.3 | 1 | 3 |
| Comparative Example 5 | Enzyme 4 (90 U per pot) | 34.9 | 2 | 2 |
| Comparative Example 6 | Enzyme 1 (180 U per pot) | 15.1 | 3 | 3 |

Grades
5: very much better than that of Comparative Example 1
4: much better than that of Comparative Example 1
3: better than that of Comparative Example 1
2: equal to that of Comparative Example 1
1: poorer than that of Comparative Example 1

First, one amylase was used singly to examine the influence of the type of amylase on the improvement in easiness of cooked rice to be loosened and texture (Comparative Examples 1 to 5).

As shown in Table 2, it was found that in a case where heat-resistant α-amylase is used in the step of cooking rice (Comparative Example 2), the decreased sticking rate and improved easiness of cooked rice to be loosened are provided, compared to a case where no enzyme is used (Comparative Example 1). It was also found that as for the texture, reconstitutability is improved to exhibit a better texture than that of Comparative Example 1. It was found that in cases where α-amylase is used in the step of cooking rice (Comparative Example 3 and 4), no improvement in easiness of cooked rice to be loosened is observed, but that as for texture, reconstitutability is improved to exhibit a better texture. In a case where glucoamylase is used in the step of cooking rice (Comparative Example 5), there was no influence on easiness of cooked rice to be loosened and texture.

Heat-resistant α-amylase, whose improvement effect on easiness of cooked rice to be loosened and texture was found, was further examined while increasing the amount of the enzyme used (Comparative Example 6). However, the result was not much different from that obtained in Comparative Example 2, and enhancement in improvement effect on easiness of cooked rice to be loosened and texture was not observed.

Next, two amylases having different optimum acting temperatures were used in combination to examine the influence of the combinations of amylases on the improvement in easiness of cooked rice to be loosened and texture.

As shown in Table 2, it was found that in a case where the combinations of amylases used in Examples 1 and 2, i.e., the combinations of heat-resistant α-amylase and α-amylase, are used in the step of cooking rice, the more decreased sticking rate and significantly improved easiness of cooked rice to be loosened are provided, compared to the cases where one enzyme is used singly (Comparative Examples 2 to 6). It was also found that as for texture, reconstitutability is more improved to exhibit a very excellent texture with appropriate stickiness and hardness. In addition, it was found that in a case where heat-resistant α-amylase and α-amylase are used in combination, the improvement effect on easiness of cooked rice to be loosened and texture is very large, compared to a case where one heat-resistant α-amylase is used in a larger amount (Comparative Example 6).

In view of these, it can be said that the method for producing processed cooked rice comprising the step of cooking rice using heat-resistant α-amylase and α-amylase in combination significantly improves both easiness of cooked rice to be loosened and texture, and thus is an extremely useful method.

In addition, also in a case where heat-resistant α-amylase and glucoamylase are used in combination in the step of cooking rice (Example 3), the improvement effect on texture was observed, compared to a case where one heat-resistant α-amylase is used in a larger amount (Comparative Example 6).

In view of these, it can be said that the method for producing processed cooked rice comprising the step of cooking rice using two amylases having different optimum acting temperatures in combination can excellently improve easiness of cooked rice to be loosened and texture, compared to a case where no enzyme is used or a case where one amylase is used singly. It can be also said that such a method for producing processed cooked rice improves easiness of cooked rice to be loosened to thereby also improve aptitude for processing in the processing of cooked rice, and therefore is useful for improving the yield.

Next, the effect of the present invention in a case where the yield of cooked rice in the step of cooking rice on producing puffed dried rice is low was confirmed by the tests below.

Example 4

Puffed dried rice was produced and obtained in the same manner as in Example 2 except that the amount of water added when cooking rice in Example 2 was changed to 140% based on the weight of rice. In this time, the yield of cooked rice after cooking rice was 2.17 (corresponding to a moisture content just after cooking of 60%).

Comparative Example 7

Puffed dried rice was produced and obtained in the same manner as in Example 4 except that no enzyme was used.

The sticking rate of the cooked rice after the primary drying in Example 4 and Comparative Example 7 each was calculated, and easiness of cooked rice to be loosened was evaluated in the same manner as described above. The evaluation was conducted according to five grades among which the evaluation result of Comparative Example 7 was defined as a grade of "2", which corresponds to the second from the lowest.

The puffed dried rice obtained in Example 4 and Comparative Example 7 was placed in a cup-like plastic container, and 7.2 g of powdered soup, 3 g of dried egg, 2.5 g of freeze-dried pork, 1.3 g of freeze-dried shrimp, and 0.9 g of dried green onion were added thereto and mixed. A lid was put on the container, and the container was sealed to obtain a food product with a container. The food product with a container was stored for three days and then opened, and 160 mL of water at 25° C. was added to the container. A lid was put on the container, and cooking was conducted in a microwave (500 W) for 5 minutes and 30 seconds and then steamed for 1 minute. The container was taken out of the microwave, and the contents were well mixed to obtain instant fried rice. Five skilled panelists ate it and evaluated the texture of the cooked rice after reconstitution. The evaluation was conducted according to five grades among which the evaluation result of Comparative Example 7 was defined as a grade of "2", which corresponds to the second from the lowest.

The results of the sticking rate, easiness of cooked rice to be loosened, and the sensory evaluation in Example 4 and Comparative Examples 7 are shown in Table 3.

TABLE 3

| Amount of water added | Enzyme used | Sticking ratio (%) | Easiness to be loosened | Texture |
| --- | --- | --- | --- | --- |
| Example 4 | Enzyme 1 (90 U per pot) + Enzyme 3 (90 U per pot) | 1.3 | 5 | 4 |
| Comparative Example 7 | None | 5.1 | 2 | 2 |

Grades
5: very much better than that of Comparative Example 7
4: much better than that of Comparative Example 7
3: better than that of Comparative Example 7
2: equal to that of Comparative Example 7
1: poorer than that of Comparative Example 7

As shown in Table 3, it was found that in a case where the yield of cooked rice in the step of cooking rice is decreased, the sticking rate is low even when no enzyme is used, but that by using two amylases having different optimum acting temperatures in the step of cooking rice, the sticking rate is more decreased to much more improve easiness of cooked rice to be loosened. It was also found that as for texture, reconstitutability is improved to exhibit an excellent texture.

In view of these, it can be said that even when the yield of cooked rice is changed in the step of cooking rice, the method for producing processed cooked rice comprising the step of cooking rice using two amylases having different optimum acting temperatures in combination can excellently improve easiness of cooked rice to be loosened and texture, compared to a case where no enzyme is used.

Example 5

Rice was cooked in the same manner as in Example 2 to obtain cooked rice having a yield of cooked rice of 2.37 (corresponding to a moisture content just after cooking of 63%).

To 100 parts by weight of this cooked rice, 5 parts by weight of vegetable and 7 parts by weight of scrambled egg as ingredients as well as 5 parts by weight of seasonings and 1.5 parts by weight of a vegetable oil were added and stirred to mix. The resultant was fried at 210 to 230° C. to prepare fried rice. Further, the fried rice was frozen by a usual method to obtain frozen fried rice.

Also in this case, easiness of cooked rice to be loosened was improved to enhance aptitude for processing in the processing of frozen cooked rice, and thus frozen cooked rice having stable quality with less uneven freezing was obtained.

250 g of this frozen fried rice was heated for 4.5 minutes by using a microwave (500 W). The fried rice after cooking had easily separable grains. Since easiness of cooked rice to be loosened on producing was improved, taste well soaked into the whole, and also the texture was very excellent.

Thus, it can be said that the method for producing processed cooked rice comprising using two amylases having different optimum acting temperatures in combination is useful also for producing frozen cooked rice.

In Examples described above, the method for producing processed cooked rice comprising the step of cooking rice using two amylases having different optimum acting temperatures has been illustrated. Also, as for a case where three or more amylases having different optimum acting temperatures are used in combination (the amounts of enzymes added: 90 U per pot (corresponding to 0.13 U per gram of rice) for Enzyme 1; 45 U per pot (corresponding to 0.064 U per gram of rice) for Enzyme 2; 45 U per pot (corresponding to 0.064 U per gram of rice) for Enzyme 3), the method was tested in the same manner as in Examples and the effect of the present invention was confirmed. It was found in such a case that easiness of cooked rice to be loosened is improved, and that therefore processed cooked rice having excellent quality with less unevenness of texture on eating can be produced.

As described above, the method for producing processed cooked rice in the present invention comprises the step of cooking rice using two or more amylases having different optimum acting temperatures. Thus, as in Examples mentioned above, the method provides cooked rice easy to be loosened in the step of cooking rice, which is further subjected to various processing to produce processed cooked rice having excellent quality.

Therefore, as for processing of cooked rice after the step of cooking rice, conventional producing steps for processed cooked rice can be applied as it is. Thus, the method of the present invention can be widely applied to not only puffed dried rice and frozen cooked rice illustrated in Examples but also other processed cooked rice such as gelatinized rice, vacuum-freeze-dried rice, and chilled cooked rice.

INDUSTRIAL APPLICABILITY

The method for producing processed cooked rice of the present invention is useful for producing processed cooked rice having easiness of cooked rice to be loosened and excellent texture.

The present application claims priority of Japanese Patent Application No. 2013-220709 filed on Oct. 24, 2013, the contents of which are incorporated herein by reference.

The invention claimed is:

1. A method for producing processed cooked rice comprising:

cooking rice with water and at least one non-heat-resistant α-amylase and at least one heat-resistant α-amylase in combination;

primary drying of the cooked rice; and then subjecting the resulting rice to secondary drying, wherein an optimum acting temperature of the at least one non-heat-resistant α-amylase is different from an optimum acting temperature of the at least one heat-resistant α-amylase, the rice that is subjected to the cooking is rice before being gelatinized, the rice is not cooked by steaming, the cooked rice immediately after the cooking has a moisture content in a range from 49% to 68%, and the cooked rice has a lower sticking rate and higher easiness of loosening, compared with rice cooked with none of the non-heat-resistant α-amylase and the heat-resistant α-amylase and rice cooked with only one of the non-heat-resistant α-amylase and the heat-resistant α-amylase, wherein the easiness of loosening of the cooked rice is evaluated after the primary drying of the cooked rice, and the sticking rate of the cooked rice is evaluated after the primary drying of the cooked rice and sieving thereof with a 3.5-mesh sieve.

2. The method for producing processed cooked rice according to claim 1, wherein the optimum acting temperature of the at least one heat-resistant α-amylase is in a range from 60 to 100° C., and the optimum acting temperature of the at least one non-heat-resistant α-amylase is in a range from 30 to 60° C.

3. The method for producing processed cooked rice according to claim 1, wherein the processed cooked rice is gelatinized rice or puffed dried rice.

4. The method for producing processed cooked rice according to claim 1, wherein both an amount of the at least one non-heat-resistant α-amylase and an amount of the at least one heat-resistant α-amylase used in the method are in a range from 0.01 to 20 U relative to one gram of uncooked rice.

5. The method for producing processed cooked rice according to claim 1, wherein an amount of the at least one non-heat-resistant α-amylase relative to the rice is same as an amount of the at least one heat-resistant α-amylase relative to the rice.

* * * * *